H. J. & W. PRINGLE.
Fifth Wheel for Carriages.
No. 88,904.  Patented April 13, 1869.
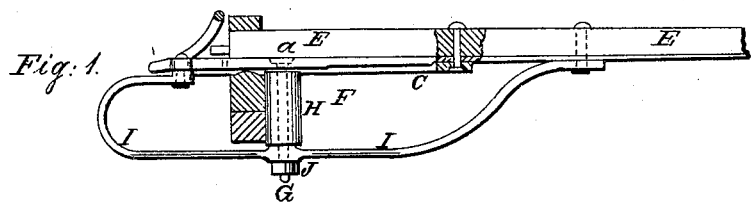
Fig. 1.
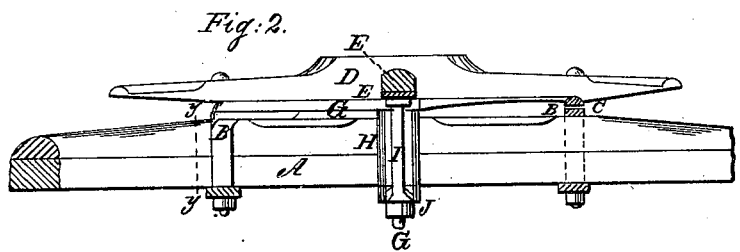
Fig. 2.
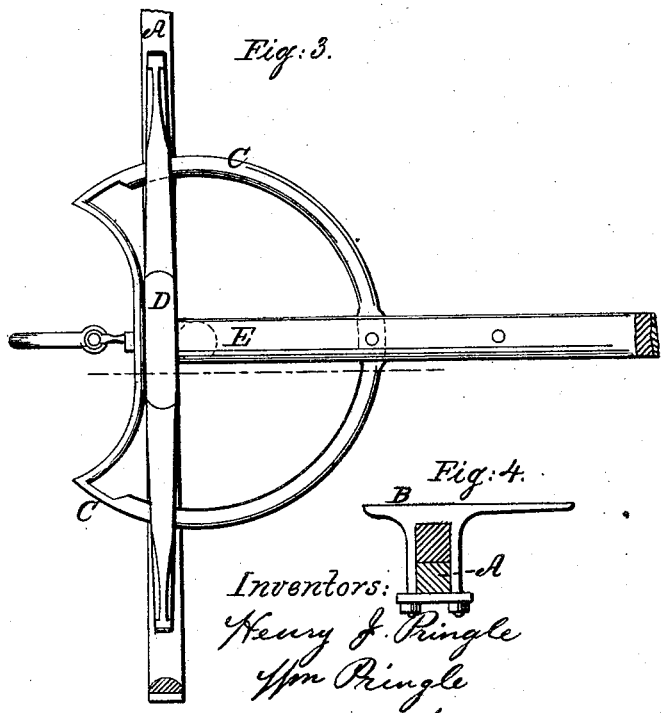
Fig. 3.
Fig. 4.
Witnesses.
Inventors:
Henry J. Pringle
Wm Pringle
per Munn & Co
Attorneys

HENRY J. PRINGLE AND WILLIAM PRINGLE, OF COLUMBUS, OHIO.

Letters Patent No. 88,904, dated April 13, 1869.

IMPROVEMENT IN CARRIAGE-COUPLINGS.

The Schedule referred to in these Letters Patent and making part of the same.

*To all whom it may concern:*

Be it known that we, HENRY J. PRINGLE and WILLIAM PRINGLE, of Columbus, in the county of Franklin, and State of Ohio, have invented a new and improved Carriage-Coupling; and we do hereby declare that the following is a full, clear, and exact description thereof, which will enable others skilled in the art to make and use the same, reference being had to the accompanying drawings, forming part of this specification.

Figure 1 is a sectional view of our improved coupling, taken through the line x–x, fig. 3.

Figure 2 is a rear view of the same.

Figure 3 is a top view of the same.

Figure 4 is a detail sectional view of the same, taken through the line y y, fig. 2.

Similar letters of reference indicate corresponding parts.

Our invention has for its object to furnish an improved coupling, for connecting the forward axle to the reach, and other parts of the carriage, which shall be simple in construction and reliable in operation; and It consists in the combination of the socket and king-bolt with the reach-plate, reach, and axle, in the manner hereinafter more fully described.

A represents the forward axle of a carriage, to which are attached the guards, or supports B, upon which the turn-plate, or fifth-wheel, C, works.

D is the bolster, to which the fifth-wheel C, and the forward end of the reach E are secured in the ordinary manner.

F is the reach-plate, which is securely attached to the reach E and bolster D, and to which the king-bolt G is securely attached.

H is a socket, formed solidly upon or securely attached to the rear side of the axle A, and which should be of such a length that the reach-plate F may rest upon its upper end.

The king-bolt G passes down through the socket H, and through the brace I, and has a nut, J, screwed upon its lower end.

The rear end of the brace, through which the king-bolt G passes, is securely attached to the reach E, and its forward end is curved upward, and attached to the forward end of the reach-plate F, as shown in figs. 1 and 3.

We claim as new, and desire to secure by Letters Patent—

The combination of the socket H and king-bolt G, with the reach E, reach-plate F, and axle A, substantially as herein shown and described, and for the purpose set forth.

HENRY J. PRINGLE.
WILLIAM PRINGLE.

Witnesses to H. J. PRINGLE:
SAMUEL GULICK,
R. B. STEVENSON.

Witnesses to WILLIAM PRINGLE:
JOHN MCNEAL,
C. A. PETTIT.